July 24, 1934. J. F. RULE 1,967,452
GLASS FORMING MACHINE
Filed Aug. 15, 1929 3 Sheets-Sheet 2
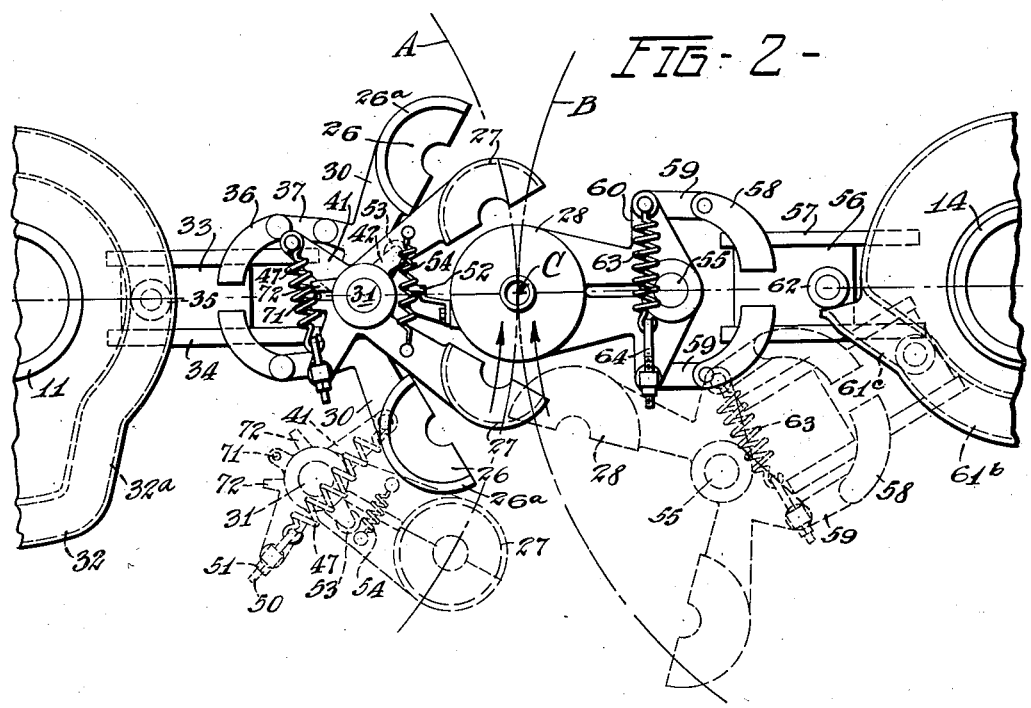
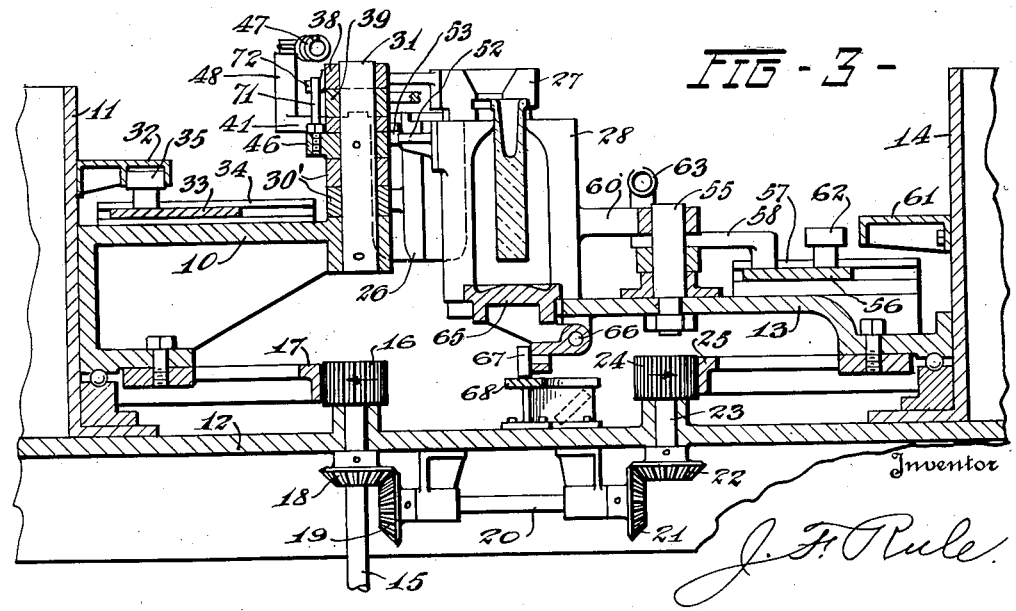
Inventor
J. F. Rule July 24, 1934.                J. F. RULE                1,967,452
                        GLASS FORMING MACHINE
                  Filed Aug. 15, 1929      3 Sheets-Sheet 3
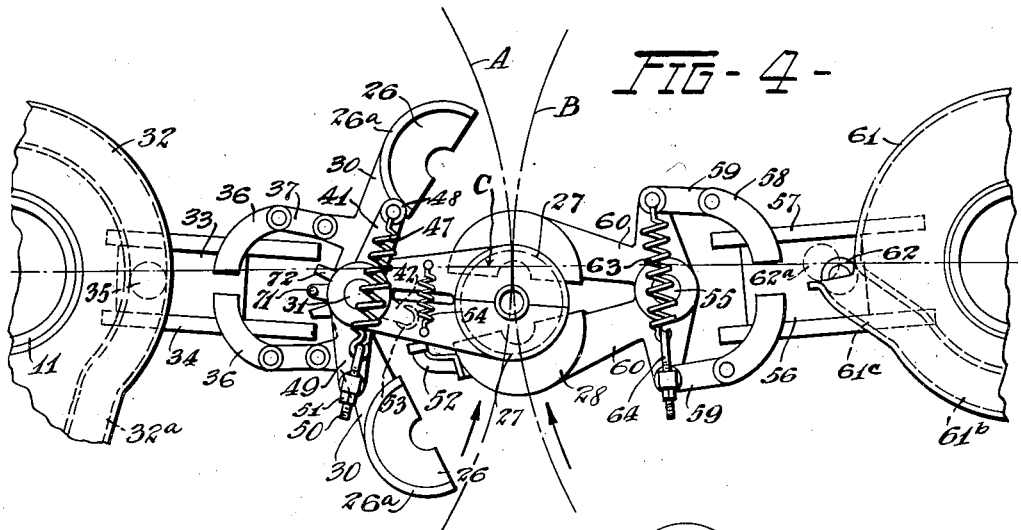
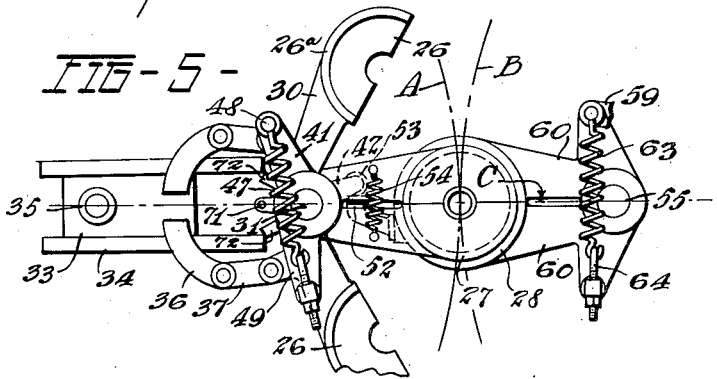
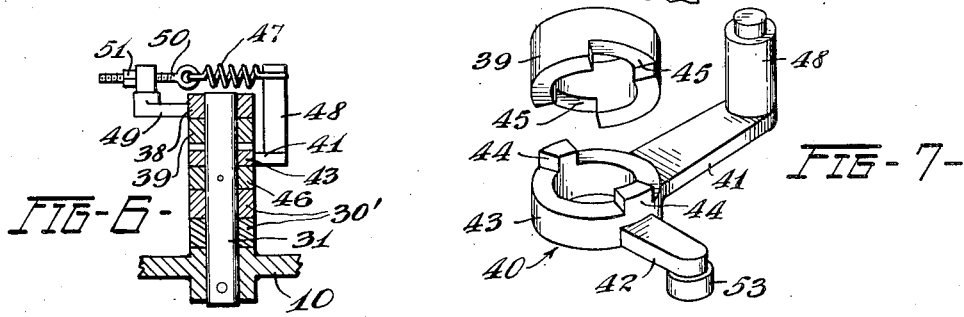
Inventor
J. F. Rule Patented July 24, 1934

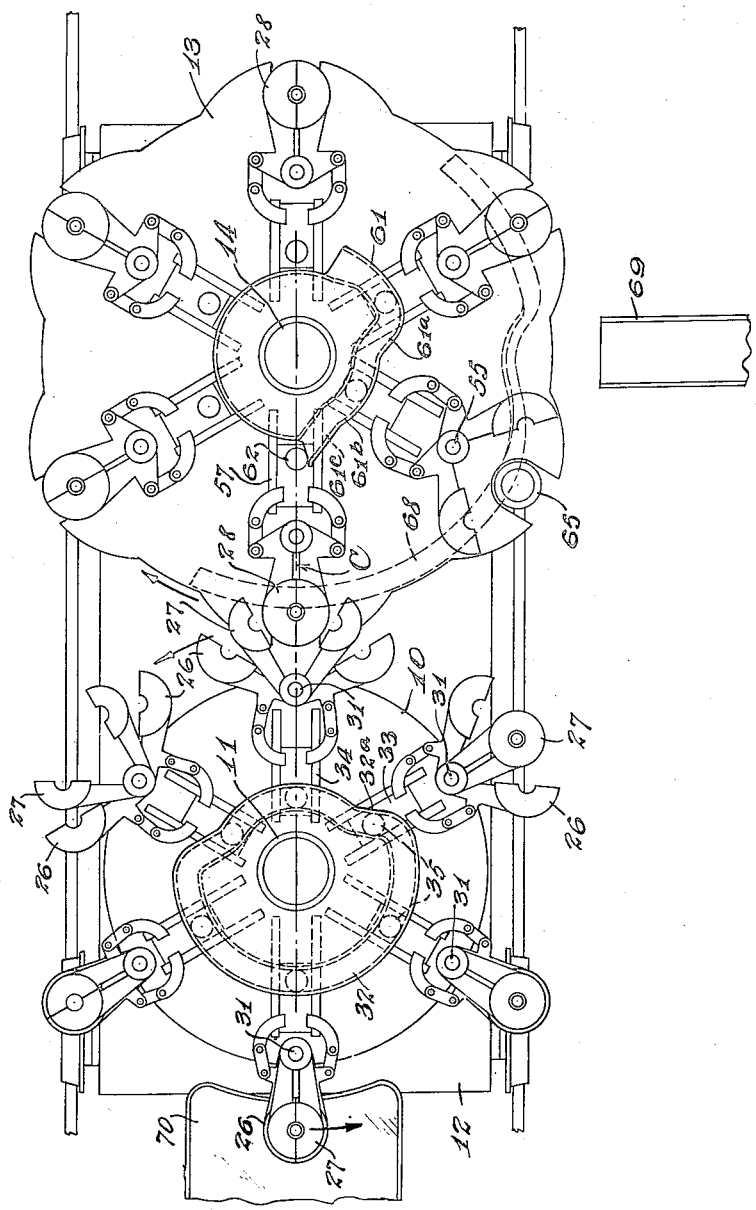

1,967,452

UNITED STATES PATENT OFFICE 1,967,452

GLASS FORMING MACHINE

John F. Rule, Toledo, Ohio, assignor to Owens-Illinois Glass Company, Toledo, Ohio, a corporation of Ohio Application August 15, 1929, Serial No. 386,141

21 Claims. (Cl. 49—9)

My invention relates to machines for forming hollow glass articles, such as bottles, jars and the like, and particularly to machines of the type in which the parisons of glass are formed in molds on a rotating carriage and then transferred to finishing molds on a separate rotating carriage and blown to final form in the finishing molds. In machines of this type, it is common practice to form the parison in a blank mold and neck mold and then transfer the parison to a finishing mold by opening the blank mold and closing the finishing mold around the bare parison which is still supported in the neck mold, after which the neck mold is opened. In making the transfer, it is desirable that the finishing mold be completely closed about the parison before the neck mold commences to open, so that the position of the parison in the mold is positively controlled during the transfer. In practice, considerable difficulty has been experienced in effecting the transfer particularly when the mold carriages are rotated continuously, owing to the fact that the neck mold and finishing mold travel in different paths which coincide only at one point throughout their rotation. With the usual method of opening and closing the molds, the transfer of the parison cannot be effected instantaneously or in a sufficiently short time to prevent relative movement of the neck mold and finishing mold while they are both closed or substantially closed around the parison. Any such relative movement tends to distort the parison.

Attempts have been made to overcome this difficulty by modifying the path of movement of the neck mold, for example, during the transfer period to coincide with that of the finishing mold thru a sufficient distance to permit an accurate transfer operation. This, however, does not completely remedy the difficulty, as any deviation of either mold from a circular path changes its distance from the center of rotation and, therefore, its speed, resulting in a relative movement of the molds during the transfer period. Moreover, such deviation from a circular path involves mechanical difficulties and complications.

An object of my invention is to provide a construction in which the above difficulties are overcome, and in which the transfer of the parison is made practically instantaneously and without requiring either mold to be moved toward or from its axis of rotation with the mold carriage or, except for its opening and closing movements, out of a circular path.

The present invention may be embodied in a construction in which the parison is formed, in the usual manner in a combined blank mold and neck mold, after which the blank mold is opened, leaving the bare parison suspended from the neck mold, and the finishing mold is then closed around the parison, after which the neck mold is opened. A feature of the invention consists in providing means for placing the finishing mold sections under spring tension operative during the final closing movement of the mold to close the mold sections around the parison with a quick or snap action, together with means operative during the final closing movement of the finishing mold to initiate a quick opening movement of the neck mold preferably under suitable spring tension. In this manner, the parison is under the complete control of the neck mold until the finishing mold is closed, but without any appreciable overlapping of the time intervals the molds are completely closed.

Other objects of the invention will appear hereinafter.

In the accompanying drawings:

Fig. 1 is a partly diagrammatic plan view of a machine embodying the principles of my invention.

Fig. 2 is a plan view of one group of molds and their actuating mechanism, the parts being in the position which they assume just after the transfer is completed.

Fig. 3 is a sectional elevation of the mechanism shown in Fig. 2.

Fig. 4 is a view similar to Fig. 2, but showing the parts just before they have reached the Fig. 2 position.

Fig. 5 is a view showing the parts the instant the finishing mold has closed, the neck mold still being in its closed position.

Fig. 6 is a detail showing the blank mold hinge pin and associated parts.

Fig. 7 is a perspective view of a device for setting the neck mold spring and means providing a lost motion connection between the said device and the neck mold.

Referring particularly to Figs. 1 and 3, the machine comprises a blank mold table or carriage 10 mounted for horizontal rotation about a center column 11 supported on a base 12, and a finishing mold table or carriage 13 mounted for rotation about a column 14 on the base 12. A vertical drive shaft 15 (Fig. 3) carries a pinion 16 running in mesh with a ring gear 17 bolted to the blank mold table 10. The drive shaft is preferably rotated continuously and thereby imparts continuous rotation to the mold table 10. The finishing mold table 13 is also rotated continuously by the drive shaft 15 operating through a train of gearing including bevel gears 18 and 19 secured, respectively, to the shaft 15 and a horizontal shaft 20, the latter having secured thereto a bevel gear 21 which drives a pinion 22 on a vertical shaft 23, to which is keyed a pinion 24 running in mesh with a ring gear 25 bolted to the table 13. The gears are so proportioned and arranged that the mold tables are driven in opposite directions and at the same angular speed.

Mounted on the blank mold table are mold groups each comprising a blank mold 26 and a neck mold 27, said groups arranged in an annular series. Finishing molds 28 are likewise arranged in an annular series on the table 13. The neck molds are arranged above and in register with the blank molds, and the circle "A" in which the centers or vertical axes of the blank molds travel is preferably of the same diameter as the circle "B" in which the axes of the finishing molds travel. Said circles are also preferably tangent at the center line "C" joining the axes of the mold tables, and the molds so arranged that each finishing mold is brought into register with the corresponding neck mold as they reach said center line.

Each blank mold comprises horizontally separable sections carried by arms 30 formed with bearing sleeves 30' (Figs. 3 and 6) pivotally mounted on a vertical pivot pin 31 keyed to and projecting upwardly from the mold table. The opening and closing movements of the blank mold are controlled by a stationary continuous cam 32 mounted on the column 11. A slide block 33 is mounted for movement radially of the mold table in guides 34 and carries a cam roll 35 running on the cam 32. Arms 36 on the slide block are connected through links 37 to the blank mold arms 30.

The arms of the neck mold 27 are provided with bearing sleeves 38 and 39 journalled on the pivot pin 31. The mechanism for controlling the opening and closing movements of the neck mold includes a setting device 40 (Fig. 7) in the form of a bell crank comprising arms 41 and 42 formed on a bearing sleeve 43 journalled on the pivot pin 31. The sleeve 43 has a lost motion driving connection with the bearing sleeve 39 of one of the neck mold sections. This connection comprises lugs 44 projecting upward from the sleeve 43 into recesses 45 formed in the lower face of the sleeve 39. The sleeve 43 is supported on a collar 46 keyed to the hinge pin 31.

A coil spring 47 for opening the neck molds is connected at one end to a post 48 on the arm 41 and at its opposite end to an arm 49 projecting radially from the bearing sleeve 38. The connection between the spring and arm 49 comprises a screw threaded rod 50 and nut 51 permitting the tension of the spring to be adjusted. While the neck mold is closed, the spring 47 is normally in the Fig. 4 position, in which the center line of the spring is to the right of the axis of the pivot pin 31. The spring, therefore, tends to hold the neck mold closed.

The setting device 40 is swung into position to initiate the opening movement of the neck mold, by means of an arm or lug 52 carried on a section of the finishing mold 28. During the final closing movement of the finishing mold the lug 52 engages a roll 53 on the arm 42 and thereby swings the bell crank 40 from the Fig. 4 position to the Fig. 5 position, thereby carrying the spring 47 to the left of the hinge pin. This movement of the bell crank takes up the lost motion between the bearing sleeves 43 and 39. The spring 47 now operates to swing the neck mold sections apart to the Fig. 2 position, as hereinafter more fully set forth. A coil spring 54 which is much weaker than the spring 47, connects the neck mold arms and holds the neck mold closed during the initial movement of the bell crank. The neck mold is closed by the closing movement of the blank mold and held closed and in register with the blank mold so long as the latter remains closed. For this purpose the blank mold sections may be provided with shoulders 26$^a$ to engage the neck molds.

The finishing mold sections 28 are mounted on hinge pins 55 fixed to the mold table 13. The mechanism for opening and closing a finishing mold includes a slide block 56 which reciprocates radially of the mold table in guides 57. Arms 58 on the slide block are connected through links 59 to the mold arms 60. The opening and closing movements of the mold are controlled in part by a stationary cam 61 on which runs a roll 62 on the slide block 56. The finishing mold is held closed at times by a coil spring 63 connected at its ends to the mold arms, one of the connections including a screw rod 64 and adjusting nut for adjusting the tension of the spring.

Each finishing mold includes a mold bottom 65 (Fig. 3) pivoted at 66 to the mold table. A roll 67 on the mold bottom plate runs on a stationary cam track 68, shaped to permit the mold bottom to tilt downward after the mold opens for discharging the finished article, and then to lift the mold bottom before the mold closes. The mold bottom is held up by the mold sections, independently of the cam while the mold remains closed. By reference to Fig. 1, it will be seen that the finishing mold remains closed during the greater portion of its revolution about the axis of the mold table.

As the mold approaches a bottle discharging position, a section 61$^a$ of the cam 61 operates to open the mold, leaving the finished article supported on the bottom plate 65 which now tilts downward and discharges the article onto a chute 69. The finishing mold remains open for a short period determined by the dwell portions 61$^b$ of the cam 61 and is then partially closed by the cam section 61$^c$. This closing movement may be comparatively slow while the cam roll 62 traverses the section 61$^c$. The cam is so shaped and positioned that the finishing mold is nearly, but not entirely, closed by the time the roll 62 reaches the end of the cam and releases the mold from the control of the cam. Fig. 4 shows the position of parts just before the roll 62 passes off the cam. It will be noted that by this time the closing movement of the mold has carried the spring 63 beyond the dead center position; that is, the center line of the spring is now to the left of or beyond the axis of the mold hinge pin 55. When the roll 62 reaches the dotted line position 62$^a$, the final closing movement of the mold takes place with a rapid or snap action under the influence of the spring 63. The release of the roll 62 from the cam and the final closing of the mold takes place when the cam roll is at, or substantially at, the center line "C" which connects the axes of the mold tables. As each neck mold and the corresponding finishing mold reach said center line at the same time, the parisons are accurately centered within the finishing mold at the instant the latter reaches its closed position and the neck mold commences to open.

The machine herein shown is of the suction gathering type. As the mold carriage 10 rotates, the blank molds are brought in succession to a position over a gathering tank or pot 70 (Fig. 1) and brought into contact with the supply of glass in the pot, either by lifting the pot or lowering the mold. The charge of glass is then gathered by suction. The mechanism for lowering the blank molds, applying suction, forming the parison, blowing the parison in the finishing mold, etc., may be of usual construction and as they do not in themselves form a part of the present invention, are not herein shown. Although a suction type of machine is herein disclosed, it will be understood that the principles of my invention can be applied to other types of machines, and the use and scope of the invention are not limited to suction gathering machines.

A résumé of the operation is as follows:

The drive shaft 15 (Fig. 3) operates through the gearing shown, to impart continuous rotation to the blank mold table 10 and finishing mold table 13 in opposite directions, so that the blank mold and finishing mold are traveling in the same direction at the instant of transfer of the parison. Considering a single mold group including a blank mold, neck mold and finishing mold, the blank mold and neck mold are held closed and in register as usual during the gathering operation and formation of the parison. As they approach the transfer position, a section 32ª of the cam 32 (Fig. 1) operates to open the blank mold, leaving the bare blank supported in and depending from the neck mold. The neck mold remains closed until it reaches the center line "C". The finishing mold which has been opened to discharge a finished article is gradually closed as it approaches the transfer position, under the control of the cam section 61°, but passes beyond the control of the cam before it has been fully closed, as hereinbefore pointed out. During this closing movement of the finishing mold the suspended parison is brought between the finishing mold sections. As the parison reaches the center line "C", the finishing mold which has just been released from control of the cam is snapped shut by the spring 63 so that the parison is enclosed in the neck mold and finishing mold which are now in register. The arm 52 during this final closing of the finishing mold throws the setting device 40 (including the bell crank lever arms 41, 42) and positions the spring 47 to the left of the hinge pin 31, this position of parts being shown in Fig. 5. The spring 47 immediately opens the neck mold, releasing the parison and permitting it to continue its travel with the finishing mold. It will be observed that the opening of the neck mold commences instantly upon completion of closing movement of the finishing mold, but not until the finishing mold is entirely closed, so that the parison is at all times under the control of either the neck mold or finishing mold. It will also be noted that the blank mold and finishing mold are traveling in the same direction, that is, perpendicular to the center line "C", at the instant of transfer, so that if there is a slight interval of time between the final closing movement of the finishing mold and commencement of the opening movement of the neck mold, there is practically no relative movement of the molds. A centering pin 71 mounted on the collar 46 is positioned in the path of lugs 72 formed on the neck mold sleeves 38 and 39 and serves to prevent either neck mold section from being carried beyond its normal open position by the spring 47. After the parison is enclosed in the finishing mold, a blowing head (not shown) operates in the usual manner to expand the parison to its final form. The application of air pressure may continue until the article is sufficiently cooled to retain its shape, after which the mold is opened by the cam section 61ª (Fig. 1) to discharge the article, as heretofore described.

Modifications may be resorted to within the spirit and scope of my invention.

What I claim is:

1. A machine for forming glass articles comprising, in combination, a blank mold carriage and a finishing mold carriage arranged side by side and rotatable about vertical axes, a blank mold and a finishing mold mounted respectively on said carriages, a neck mold mounted on the blank mold carriage above and in register with the blank mold, each of said molds comprising separable sections, means for opening the blank mold while rotating with the blank mold carriage and leaving a parison suspended from the neck mold, means for closing the finishing mold around the suspended parison while the finishing mold is rotating with its carriage, a spring operable to open the neck mold while the latter is advancing with the blank mold carriage, and means operable by the finishing mold during its final closing movement to bring said spring into activity and cause it to initiate an opening movement of the neck mold substantially simultaneously with the completion of the closing movement of the finishing mold.

2. A machine for forming glass articles comprising, in combination, a blank mold carriage and a finishing mold carriage arranged side by side and rotatable about vertical axes, a blank mold and a finishing mold mounted respectively on said carriages, a neck mold mounted on the blank mold carriage above and in register with the blank mold, each of said molds comprising separable sections, means for opening the blank mold and leaving a parison suspended from the neck mold, means for closing the finishing mold around the suspended parison, said mold closing means including mechanism for causing a comparatively slow initial closing movement of the finishing mold and a spring operable to effect a rapid final closing movement of the finishing mold, and means brought into activity by said final movement of the finishing mold to open the neck mold.

3. A machine for forming glass articles comprising, in combination, a blank mold carriage and a finishing mold carriage arranged side by side and rotatable about vertical axes, a blank mold and a finishing mold mounted respectively on said carriages, a neck mold mounted on the blank mold carriage above and in register with the blank mold, each of said molds comprising separable sections, means for opening the blank mold and leaving a parison suspended from the neck mold, means for closing the finishing mold around the suspended parison, a spring operable to open the neck mold, and means controlled by the finishing mold and actuated by the final closing movement thereof to effect an operative relation between the neck mold and said spring and thereby cause the spring to open the neck mold.

4. A machine for forming glass articles comprising, in combination, a blank mold carriage and a finishing mold carriage arranged side by side and rotatable about vertical axes, a blank mold and a finishing mold mounted respectively on said carriages, a neck mold mounted on the blank mold carriage above and in register with the blank mold, each of said molds comprising separable sections, means for opening the blank mold while rotating with the blank mold carriage and leaving a parison suspended from the neck mold, means for closing the finishing mold around the suspended parison while the finishing mold is rotating with its carriage, a spring operable to open the neck mold while the latter is advancing with the blank mold carriage, and means operable by the finishing mold during its final closing movement to bring said spring into activity as the finishing mold completes its closing movement, said molds so arranged that their axes travel in circles tangent at the center line joining the axes of rotation of the mold carriages, the axes of the neck mold and finishing mold coinciding as they cross said center line, the movements of the parts being timed to complete the closing movement of the finishing mold and commence the opening movement of the neck mold as their axes cross said center line.

5. In a machine for forming glass articles, the combination of a mold carriage, a blank mold and a neck mold thereon, each of said molds comprising separable sections, a hinge pin on which said sections are mounted, means for opening and closing the blank mold, connections between the blank mold and neck mold whereby the closing of the blank mold closes the neck mold, the blank mold being movable to open position while the neck mold remains closed, a spring arranged to hold the neck mold closed during the opening movement of the blank mold, rock arms mounted to swing about the axis of said hinge pin and operatively connected to the neck mold sections, a coil spring held under tension between said rock arms and operable to open the neck mold, and means to bring said last mentioned spring into activity after the blank mold is opened.

6. In a machine for forming glass articles, the combination of a mold carriage, a blank mold and a neck mold thereon, each of said molds comprising separable sections, a hinge pin on which said sections are mounted, the blank mold being arranged to hold the neck mold closed while the blank mold remains closed, means for opening the blank mold while the neck mold remains closed, arms mounted to rock on said hinge pin and arranged to operate the neck mold sections, a spring connected to said arms and operable to effect a quick opening of the neck mold, and means to bring said spring into activity after the blank mold has reached its open position.

7. In a machine for forming glass articles, the combination of a blank mold carriage, a blank mold thereon, a finishing mold carriage, a finishing mold thereon, said carriages arranged side by side, means for continuously rotating said carriages and the molds thereon, a parison transfer device comprising a pair of gripping members arranged to hold a parison while in the blank mold, means for opening the blank mold while the parison is held by said gripping members, means to close the finishing mold about the parison, and means actuated by the finishing mold during its closing movement to cause said gripping members to release the parison as the finishing mold closes.

8. In a machine for forming glass articles, the combination of a blank mold carriage, a blank mold thereon, a finishing mold carriage, a finishing mold thereon, said carriages arranged side by side, means for continuously rotating said carriages and molds, a parison transfer device comprising a pair of gripping members arranged to hold a parison while in the blank mold, means for opening the blank mold while the parison is held by said gripping members, means to close the finishing mold about the parison, a spring operable to separate the gripping members, and means controlled by the closing movement of the finishing mold to bring said spring into activity.

9. In a machine for forming glass articles, the combination of a blank mold carriage, a blank mold thereon, a finishing mold carriage, a finishing mold thereon, said carriages arranged side by side, means for continuously rotating said carriages, a parison transfer device comprising a pair of gripping members arranged to hold a parison while in the blank mold, means for opening the blank mold while the parison is held by said gripping members, a cam operable to cause an initial closing movement of the finishing mold, a spring held inoperative by the cam during said initial closing movement of the finishing mold and operable to effect a quick final closing movement of the finishing mold, a spring to separate the gripping members, and means actuated by the first mentioned spring during said final closing movement to bring the other spring into activity.

10. In a machine for forming glass articles, the combination of a mold comprising separable sections, a cam operable to effect opening and closing movements of the mold, and means to apply spring pressure to the mold sections operable independently of the cam to effect the final closing movement of the mold sections.

11. In a machine for forming glass articles, the combination of a rotating mold carriage, a mold thereon comprising partible mold sections, a stationary cam operable to effect an initial closing movement of the mold, said mold being carried beyond the range of the cam control during said initial closing movement and thereby released for free final closing movement independent of its rotation with the mold carriage, and a spring operable independently of the cam for completing the closing movement of the mold when the mold is released from its cam control.

12. In a machine for forming glass articles, the combination of a mold comprising separable sections, arms carrying said sections and pivoted to swing about a common fulcrum, a tension spring connected to said arms in position to apply a spring pressure to the mold sections opposing opening movement thereof when the mold is closed and a spring pressure opposing closing movement thereof when the mold is open, and means operable separately from the spring for effecting opening and closing movements of the mold.

13. In a machine for forming glass articles, the combination of a mold comprising separable sections, arms carrying said sections and pivoted to swing about a common fulcrum, a tension spring connected to said arms in position to apply a spring pressure to the mold sections opposing opening movement thereof when the mold is closed and a spring pressure opposing closing movement thereof when the mold is open, a traveling carriage on which the mold is mounted, and stationary cams for effecting opening and closing movements of the mold.

14. In a machine for forming glass articles, the combination of a blank mold table and a finishing mold table arranged side by side, means for rotating said tables, a blank mold on the blank mold table and a finishing mold on the finishing mold table, a neck mold, means cooperating with the blank mold and neck mold for forming a parison therein, means for opening the blank mold and leaving the parison supported by the neck mold, means for closing the finishing mold around the parison, and means controlled by the finishing mold and operated by the closing movement thereof to initiate an opening movement of the neck mold.

15. The combination of a blank mold, a neck mold in register therewith, a finishing mold, each of said molds comprising separable sections, means for opening the blank mold, leaving a parison of glass supported in the neck mold, means for causing the neck mold and finishing mold to travel in separate paths arranged side by side, means for closing the finishing mold around the parison while the latter is supported in the neck mold, means including a spring for opening the neck mold, and a setting device operated by the finishing mold during its closing movement to bring said spring into activity and cause it to open the neck mold.

16. In a machine for forming glass articles, the combination of a neck mold and a finishing mold, each comprising separable sections, means for causing said molds to travel continuously in separate horizontal paths arranged side by side, means for forming a parison and suspending it from the neck mold, means for closing the finishing mold around the suspended parison, and automatic means including a spring controlled by said last mentioned means for commencing an opening movement of the neck mold simultaneously with the completion of the closing movement of the finishing mold around the parison.

17. The combination of a mold comprising separable sections, a spring holding the mold sections closed, a second spring, and means for setting said second spring and causing it to overcome the first mentioned spring and open the mold in opposition to the mold closing tension of the first mentioned spring.

18. The combination of a mold comprising separable sections, a spring holding the mold sections closed, a second spring having operative connections with the mold sections and when in one position applying a closing tension to the molds supplementing the tension of the first mentioned spring, and means for shifting said second spring and causing it to open the mold in opposition to the first mentioned spring.

19. The combination of a mold comprising separable sections mounted to swing about a common axis for opening and closing the mold, rock arms mounted to swing about said axis, a tension spring connecting said arms and movable from one side to the other of said axis by the relative movement of said arms, and operative connections between said arms and the mold section by which said spring when on one side of the axis applies a closing tension to the mold sections and when on the other side of said axis applies an opening tension to the mold sections.

20. The combination of a mold comprising separable sections, arms carrying said sections, a pivot pin on which said arms are mounted to swing for opening and closing the mold, a setting device mounted to rock on said pin and having a lost motion connection with one of the mold arms, a tension spring interposed between said setting device and the other mold arm, said spring arranged to apply a mold closing tension to the mold arms when said device is in one position, and means for moving said setting device and thereby moving the spring into position to apply a mold opening tension to the mold arms.

21. The combination of a neck mold comprising separable sections mounted to swing about an axis for opening and closing the neck mold, a blank mold comprising separable sections mounted to swing about said axis, means carried by the blank mold sections for closing the neck molds when the blank mold is closed, means for opening the blank mold independently of the neck mold while the latter remains closed, a spring, and means to set said spring after the blank mold has opened and cause it to snap the neck mold to open position.

JOHN F. RULE.